July 3, 1934.  N. TASLITT  1,965,323
AQUARIUM
Filed April 30, 1932  2 Sheets-Sheet 1

Inventor
Nathan Taslitt
By Clarence A. O'Brien
Attorney

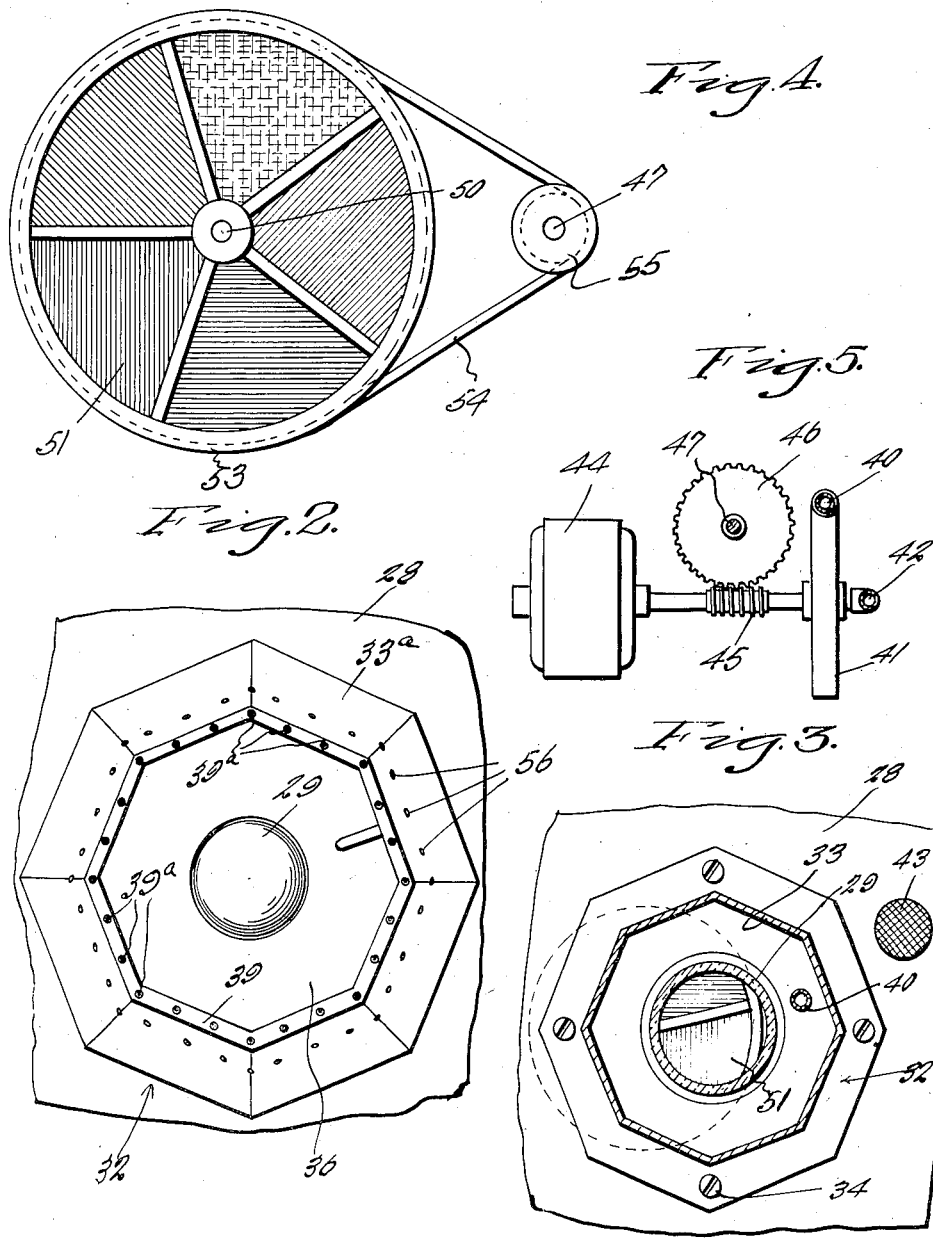

Patented July 3, 1934

1,965,323

UNITED STATES PATENT OFFICE 1,965,323

AQUARIUM

Nathan Taslitt, Hartford, Conn., assignor of one-half to Norman Taslitt and one-half to Rae Taslitt, both of Hartford, Conn.

Application April 30, 1932, Serial No. 608,489

2 Claims. (Cl. 299—4)

This invention relates to aquariums and has as its object the provision of an improved combined fountain and aquarium.

An object of the invention is to provide an ornamental aquarium that in addition to being useful and efficient will be very attractive and pleasing to the eye.

The invention together with its object and advantages will be best understood from a study of the following description taken in connection with the accompanying drawings wherein:

Figure 2 is a top plan view showing the arrangement of the spray head of the fountain.

Figure 3 is a sectional elevational view illustrating certain features and details of construction to be hereinafter more fully referred to.

Figure 4 is a plan view of a color changing disk and a portion of the drive means therefor.

Figure 5 is a detail plan view, certain parts being shown in section, illustrating the manner of driving a pump and the color disk from an electric motor.

Figure 1:
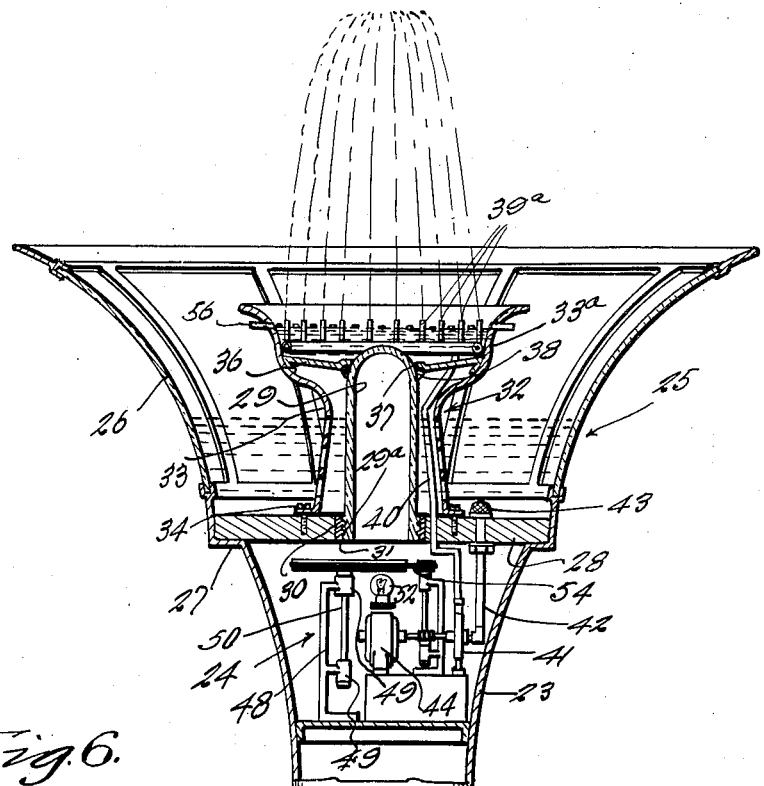
Figure 1 is a view partly in section and partly in elevation, of a combined aquarium and fountain embodying the features of the present invention.

In Figures 1 to 5 I have illustrated an improved combined fountain and aquarium embodying the features of my invention, and with reference more in detail to these figures it will be seen that there is provided a pedestal 23 that is hollowed out to provide a chamber 24, and above the chamber 24 there is provided a suitably ornate bowl designated generally by the reference character 25.

While the invention is not primarily concerned with the particular type or structure of bowl employed, or its manner of association with the pedestal 23, the bowl 25 for the sake of illustration is shown as consisting of a suitable frame structure integral with the pedestal and supporting transparent panels 26 constituting the wall or rim of the bowl.

At the junction of the bowl frame and pedestal 23 there is provided an annular shoulder 27 which supports a plate 28, which plate 28 may be of slate or any other suitable material and constitutes the bottom of the bowl 25.

In conjunction with this form of the invention I also employ a globe 29 having an externally threaded neck 29a. The bottom 28 is also provided with a centrally located opening 30 within which is fixedly secured by cementing or in any other suitable manner an internally threaded sleeve or annulus 31 into which is screwed the neck 11a so that the globe 29 is supported in a vertical position, and extends upwardly within the bowl 25.

Figure 6:
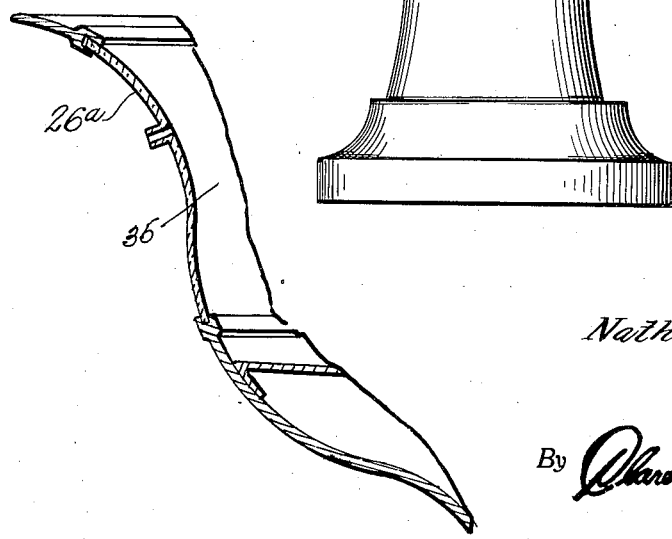
Figure 6 is a fragmentary sectional elevational view of a slightly modified form of cup forming part of the combined fountain and aquarium structure.

Arranged within the bowl 25 is an ornate cup or receptacle designated generally by the reference character 32. The cup 32 includes a hollow relatively short pedestal portion 33 which at its bottom end is provided with an outstanding flange secured to the bottom 28 by bolts or other fastening elements 34. The pedestal 33 is preferably of grill or "open work" design so that the globe 29 is clearly visible. The pedestal part 23 of the bowl 22 preferably tapers, decreasing in diameter from its lower to its upper end and at its upper end merging with the receptacle part 33a of said bowl. The receptacle part 33a may be of an opaque material, as suggested in Figure 1, or as suggested in Figure 6 may be in construction similar to the bowl 25, being as shown in Figure 6 so constructed as to have the wall or rim thereof consisting of a plurality of transparent panels 26a.

Arranged in the receptacle part 33a of the bowl 32 is a partition 36 forming a bottom for the receptacle part and inclined toward its center and at its center being apertured as at 37 to accommodate the upper portion of the globe 29 as clearly shown in Figure 1. About the opening 37 there is provided a suitable groove accommodating a gasket 38, of rubber or similar material to provide a fluid tight joint, and thereby preclude the escape of water through the aperture 37 as is apparent.

Arranged within the receptacle part 33a is a spray head 39 which consists of a tube disposed adjacent the stem of the receptacle part and provided on its top side with upwardly projecting discharge tubes 39.

A feed pipe for the spray head 39 is designated by the reference numeral 40, and as shown in Figure 1 the pipe 40 extends through a suitable opening provided in the bottom 28, and has its upper portion arranged within the pedestal part 33 of the cup 32, said pipe at its uppermost end being suitably connected with the spray head 39. At its lower end the pipe 40 is suitably connected with the outlet side of a conventional pump 41 suitably mounted within chamber 24.

The bowl 25 is adapted to contain water to a suitable depth and a pipe 42 extends from the bottom 28 to the inlet side of the pump 41. On the upper end of the pipe 42 within the bowl 25 is a suitable screen 43.

The pump 41 is suitably driven from an electric motor 44 and the shaft connecting the pump 41 with the motor 44 is provided with a worm 45 meshing with a gear 46 provided on a vertical shaft 47 suitably journalled within the chamber 24. Also mounted within the chamber 24 is a bracket 48 provided with vertically alined relatively spaced bearings 49 in which is journalled a vertical shaft 50 provided on its upper end with a change-color disk 51, the color disk 51 being of a type known in the art and having a plurality of segmental sections each of a different color. The disk 51 is mounted in suitable position relative to the globe 29, and suitably mounted beneath the disk 51 and eccentrically arranged relative thereto is an illuminating element, the same in the present instance being in the nature of an electric lamp bulb 52. Integral with the change color disk 51 is a pulley wheel 53 over which is trained a drive belt 54, the latter being also trained over a relatively smaller grooved pulley 55 provided on the upper end of shaft 47.

From the description thus far of this form of the invention it will be apparent that water to a suitable level is contained within the bowl 25 and through the medium of the motor driven pump a continuous circulation is provided whereby the water is drawn from the bowl 25 and forced upwardly to discharge in the form of a spray from the spray head as suggested in Figure 1, the falling spray playing on the water contained in the receptacle part 33a of the bowl to a suitable depth, it being noted that the upper end of the spray emitting tubes 39a terminate above the level of the water in the receptacle part 33a, such part being provided on its rim or wall with a circular series of relatively spaced tubes 56 whereby provision is made for maintaining the water in the receptacle part 33a at a predetermined level in a manner thought apparent. During the operation just described the change-color disk will be rotated at a suitable speed for bringing the different color segments opposite to the lamp 52 enhancing the attractiveness of the fountain.

It will be noted, that regardless of the depth of the water in the bowl 25, the colored light rays are projected to the top of the spray; and further, that by keeping the water level in the receptacle 33 a little above the top of the globe 29 the colored light rays are reflected through the open work design or grill of the member 32 on to the water flowing from the tube 56 and also on to the surface of the water in the bowl 25.

It is readily apparent that the fountain may also serve in the nature of an aquarium, the fish being placed in the bowl 25.

Having thus described my invention, what I claim as new is:

1. In a combined fountain and aquarium, a transparent bowl, a pedestal supporting the bowl and provided with a chamber, said bowl having a bottom providing a top for the chamber, and said bottom having an aperture therein, a receptacle arranged within said bowl and supporting means for the receptacle rising vertically from the bottom of the bowl about said aperture, said receptacle having a bottom provided with an aperture in substantial alinement with the aperture in the bottom of said bowl, a transparent globe having a closed upper end fitting in the aperture in the bottom of the receptacle, and an open lower end fitting in the aperture in the bottom of said bowl, a lamp mounted in the chamber of said pedestal in substantial alinement with said globe, a revoluble change color disk mounted in the chamber and through which the fountain is illuminated, a spray head arranged within said receptacle, water conducting means within said chamber extending from the bowl into the chamber and from the chamber to the spray head to draw the water from the bowl and to raise the same to the spray head, said water conducting means including a pump, a motor for driving the pump, and a driving connection between the motor and the pump including means for rotating the change color disk.

2. In a combined fountain and aquarium, the combination of a pedestal having a chamber therein, a water containing bowl mounted on the pedestal and having a bottom constituting the top wall of said chamber, said bottom being provided with an opening, a tubular support rising from the bottom of said bowl concentrically of said opening, a water receptacle mounted on the support and having a bottom provided with an opening in substantial alinement with the first named opening, a transparent globe arranged within said support and having a closed upper end fitting within the opening in the bottom of said receptacle, and an open lower end fitting within the opening in the bottom of said bowl, an illuminating element arranged in said chamber in substantial alinement with said globe, a vertical shaft mounted in said chamber, a disk mounted on said shaft to rotate therewith and having different-colored segments moving between the globe and illuminating element driving means for said shaft, and water conducting means extending through the chamber in the pedestal from the bowl to said receptacle and including means for drawing water from the bowl and to raise the water to a point of discharge internally of said receptacle.

NATHAN TASLITT.